UNITED STATES PATENT OFFICE.

WILLIAM HEWITT PAUL, OF BIRKENHEAD, ENGLAND.

TREATING GRAIN FOR MILLING.

No. 929,481.     Specification of Letters Patent.     Patented July 27, 1909.

Application filed June 1, 1908. Serial No. 436,100.

*To all whom it may concern:*

Be it known that I, WILLIAM HEWITT PAUL, subject of the King of Great Britain, residing at Birkenhead, in the county of Chester, in the Kingdom of England, miller, have invented certain new and useful Improvements in Treating Grain for Milling, for which application has been made in Great Britain, No. 24,129, dated the 31st of October, 1907.

In the art of milling, it is a desideratum to manufacture (from a given quantity of grain), the greatest amount of flour of the highest and best quality at the least possible cost. By the new process of heating and conditioning grain for milling, forming the subject of the present invention I lay claim to important improvements, over those at present in use. All the experiments I have made, have demonstrated that the grain is in a better condition for milling after the heating treatment than before, and that there is a change in the resulting flour which is a decided improvement.

In carrying the invention into effect, the process consists broadly speaking of first washing the grain, and allowing it to stand for some time. This is not only for the purpose of cleaning, but to allow a certain amount of moisture to be absorbed by the grain. The grain is then subjected to a suitable temperature and allowed to stand at that temperature for a certain length of time, during which the desirable changes take place.

My experiments were carried out in the following way, using wheat as the grain. The wheat was cleaned and washed by the methods usually adopted in milling. The damp wheat was then allowed to stand in bulk in a silo for six hours, during which time the moisture penetrated the outer coverings of the wheat berry sufficiently for the purpose of subsequent treatment. The wheat was then subjected to the improved process of conditioning, and raised to a temperature of 100° F. (Probably some changes occur at temperatures varying say from 80° F. to 120° F., but 100° F. has proved to give the best result in practice.) The temperature of the wheat must be raised by a dry heat, or by live steam in such a way that excessive moisture does not penetrate into the interior of the wheat berry, a condition which is not desired. The actual method adopted by me to bring about the desired increase of temperature (but which might probably be brought about more readily and more economically by other methods of dry heating) was by passing the wheat through a steam-jacketed cylinder, inclosing a revolving worm, which carried the wheat along the inside of the cylinder and at the same time gave it the necessary motion to insure uniform heating of the wheat. The inlet of steam to the jacketed cylinder was regulated by a valve, so that the temperature could be raised or lowered as desired. The wheat after passing through the heater was passed into a silo or bin and allowed to stand for from 2 to 24 hours. It was found in the experiments that 6 hours gave the best results, but that the time is more or less governed by the amount of moisture the wheat contains, or the kind of wheat—if it be a hard or soft variety. After standing in the silo the desired length of time, the wheat is ready for milling in the usual way. The nature of the changes in the flour brought about by the conditioning of the wheat by this heating process are not at present exactly known, but it is thought that they are, in all probability, due to the action of either organic ferments, or possibly bacteria, or possibly a combination of the same acting on one or more of the constituents of the flour, resulting in slight chemical changes which have a beneficial action on the flour, the additional heat and moisture providing suitable conditions for the development of such changes. The nature of the changes so far as the improved physical condition of the wheat for milling is concerned, are more easily explained. They are undoubtedly due to a toughening of the outer coats or bran, and the mellowing and tempering of the other parts of the various kinds of wheat (both hard and soft) which go to make up the blend of wheat, the additional heat and moisture bringing about these changes during the time the wheat is standing in the silo.

The advantages and results obtained for this process are broadly speaking divided into two kinds:—(*a*) A well-conditioned, mellowed wheat easy to grind. (*b*) An improved quality of the flour from such tempered wheat. The advantages may be further enumerated as follows:—

(*a*) 1. The wheat, after heating and standing, or in other words, after conditioning, is found to have changed physically. 2. The outer coverings of the wheat berry, which it is desirable to remove in the process of milling, are tougher, while the endosperm or floury part of the berry is more friable and open. 3. Less power is required to mill such wheat, and the separation of branny particles and other matters, it is desirable to remove from the various stocks, is more easily effected. 4. The semolina is whiter, brighter and cleaner. 5. There is a greater percentage of broad bran.

(b) 1. The flour is whiter, apparently some bleaching action takes place during the treatment. 2. The flour is purer, owing to a better separation of the, or absence of, minute particles of bran and germ. 3. The water-absorption power of the flour is increased or in other words, the flour takes up more water in making into dough, hence an increase in the number of loaves per sack of flour. 4. The bread is whiter, has a better bloom, and a better flavored loaf is made from the flour.

I declare that what I claim is:—

1. The process of conditioning grain which consists in first washing with water, second, allowing the damp wheat to stand in bulk for about six to twelve hours, then raising it to a temperature of about 100 degrees Fahr., and lastly, allowing it to stand in bulk in this state for about six hours, whereby the bran may be more readily separated from the remainder of the grain.

2. The process of conditioning grain, which consists in letting it stand in bulk in a moist condition for about six to twelve hours, then heating it to about 100 degrees Fahr. by means of dry heat, and lastly letting it stand again in bulk for about six hours, whereby the bran may be more readily separated from the remainder of the grain.

3. The process of conditioning grain, which consists in moistening it, letting it stand for about six to twelve hours in bulk, then causing it to pass over heated surfaces with stirring till it arrives at a uniform heat of about 100 degrees Fahr., and then allowing it to stand in bulk for about six hours, whereby the bran may be more readily separated from the remainder of the grain.

In witness whereof, I have hereunto signed my name this 19th day of May 1908, in the presence of two subscribing witnesses.

WILLIAM HEWITT PAUL.

Witnesses:
 DAVID JOHN OWEN,
 FREDERICK SURRIDGE JONES.